US011939007B2

(12) United States Patent
Li

(10) Patent No.: US 11,939,007 B2
(45) Date of Patent: Mar. 26, 2024

(54) STEERING MECHANISM OF ALL-TERRAIN VEHICLE AND ALL-TERRAIN VEHICLE

(71) Applicant: SEGWAY TECHNOLOGY CO., LTD., Jiangsu (CN)

(72) Inventor: Xiang Li, Jiangsu (CN)

(73) Assignee: SEGWAY TECHNOLOGY CO., LTD., Changzhou (CN)

( * ) Notice: Subject to any disclaimer, the term of this patent is extended or adjusted under 35 U.S.C. 154(b) by 450 days.

(21) Appl. No.: 17/231,187

(22) Filed: Apr. 15, 2021

(65) Prior Publication Data
US 2021/0323601 A1 Oct. 21, 2021

(30) Foreign Application Priority Data

Apr. 15, 2020 (CN) .......................... 202020556105.6

(51) Int. Cl.
*B62D 5/04* (2006.01)
*B62D 1/20* (2006.01)
*B62K 5/08* (2006.01)
*B62K 21/12* (2006.01)

(52) U.S. Cl.
CPC ............. *B62D 5/0421* (2013.01); *B62D 1/20* (2013.01); *B62K 5/08* (2013.01); *B62K 21/12* (2013.01)

(58) Field of Classification Search
CPC .......... B62D 5/0421; B62D 1/20; B62K 5/08; B62K 21/12
See application file for complete search history.

(56) References Cited

U.S. PATENT DOCUMENTS

| 3,120,744 | A | * | 2/1964 | Dunn | ..................... F16D 3/2052 464/7 |
| 4,921,470 | A | | 5/1990 | Kotani et al. | |
| 2003/0027641 | A1 | * | 2/2003 | Parsons | ..................... F16D 3/46 464/139 |

FOREIGN PATENT DOCUMENTS

| CN | 203819322 U | * | 9/2014 | ............... B62D 3/08 |
| CN | 108349529 A | * | 7/2018 | ............... B62D 5/04 |
| CN | 108791465 A | * | 11/2018 | |
| CN | 110239611 A | | 9/2019 | |
| DE | 102017214299 A1 | * | 2/2019 | |
| EP | 0048564 A2 | * | 3/1982 | ............... F16D 3/46 |

(Continued)

OTHER PUBLICATIONS

European Extended Search Report dated Sep. 10, 2021 for Application No. 21168596.1, 9 pages.

*Primary Examiner* — Jacob D Knutson
(74) *Attorney, Agent, or Firm* — Frost Brown Todd LLP

(57) ABSTRACT

A steering mechanism of an all-terrain vehicle includes: a steering shaft; a power steering system; and an adjusting mechanism including a ball joint, a first connecting shaft and a second connecting shaft. The first connecting shaft has a first end provided with a first ball groove, the second connecting shaft has a first end provided with a second ball groove, and the first ball groove and the second ball groove each accommodate a partial structure of the ball joint, such that the first connecting shaft and the second connecting shaft are rotatably coupled by the ball joint; and a second end of the first connecting shaft away from the first ball groove is coupled to the steering shaft, and a second end of the second connecting shaft away from the second ball groove is coupled to the power steering system. An all-terrain vehicle is also disclosed.

16 Claims, 6 Drawing Sheets

(56) References Cited

FOREIGN PATENT DOCUMENTS

EP    0048564  A2   3/1982
FR    2793287  A1   11/2000

* cited by examiner

STEERING MECHANISM OF ALL-TERRAIN VEHICLE AND ALL-TERRAIN VEHICLE

CROSS-REFERENCE TO RELATED APPLICATION

This application is based on and claims priority to Chinese Application No. 202020556105.6, filed on Apr. 15, 2020, the entire contents of which are incorporated herein by reference for all purposes.

FIELD

The present disclosure relates to the field of vehicle manufacturing, and more particularly, to a steering mechanism of an all-terrain vehicle and an all-terrain vehicle.

BACKGROUND

In the related art, a steering shaft of an all-terrain vehicle is generally directly and rigidly coupled to a power steering system, but due to certain errors in manufacturing and assembling processes, there is a situation where the steering shaft is not coaxial with the power steering system, such that a steering wheel of the all-terrain vehicle will become heavy or difficult to turn in a long-term frequent steering process, which in turn causes parts for fixing the steering shaft to be easily worn, and ultimately affects driving safety.

SUMMARY

An embodiment of the present disclosure provides a steering mechanism of an all-terrain vehicle, including: a steering shaft; a power steering system; and an adjusting mechanism including a ball joint, a first connecting shaft and a second connecting shaft. The first connecting shaft has a first end provided with a first ball groove, the second connecting shaft has a first end provided with a second ball groove, and each of the first ball groove and the second ball groove is configured to accommodate a partial structure of the ball joint, to allow the first connecting shaft and the second connecting shaft to be rotatably coupled by the ball joint; a second end of the first connecting shaft away from the first ball groove is coupled to the steering shaft, and a second end of the second connecting shaft away from the second ball groove is coupled to the power steering system.

Another embodiment of the present disclosure further provides an all-terrain vehicle of a straddle type. The all-terrain vehicle includes a frame and a above steering mechanism. The steering mechanism includes a steering shaft; a the power steering system is fixed to the frame; and an adjusting mechanism including a ball joint, a first connecting shaft and a second connecting shaft. The first connecting shaft has a first end provided with a first ball groove, the second connecting shaft has a first end provided with a second ball groove, and each of the first ball groove and the second ball groove is configured to accommodate a partial structure of the ball joint, to allow the first connecting shaft and the second connecting shaft to be rotatably coupled by the ball joint; a second end of the first connecting shaft away from the first ball groove is coupled to the steering shaft, and a second end of the second connecting shaft away from the second ball groove is coupled to the power steering system.

DETAILED DESCRIPTION

Figure 1:
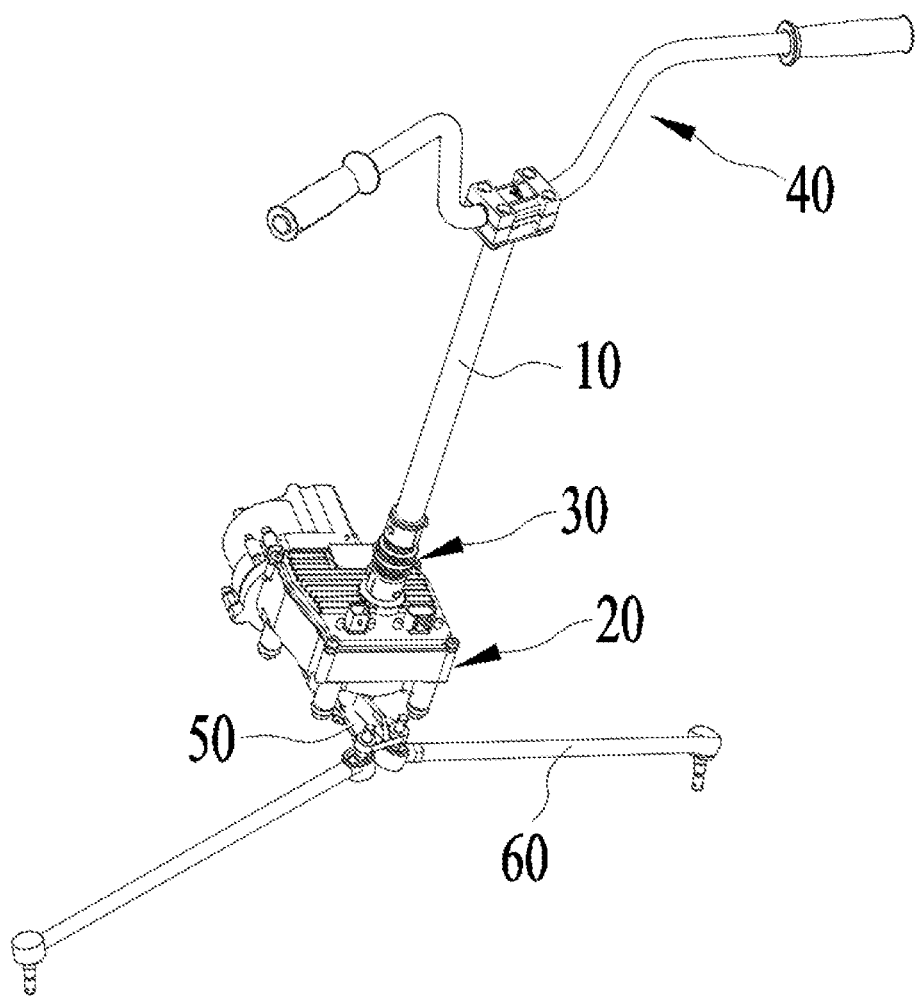
FIG. 1 is a schematic structural diagram of a steering mechanism according to an embodiment of the present disclosure.

It should be noted that embodiments and technical features in the embodiments of the present disclosure may be combined with each other without conflict, and detailed description shall be understood as explanation on principles of the present disclosure rather than construed as limitation of the present disclosure.

An embodiment of the present disclosure provides a steering mechanism of an all-terrain vehicle. Referring to FIGS. 1 to 6, the steering mechanism includes a steering shaft 10, a power steering system 20 and an adjusting mechanism 30. The adjusting mechanism 30 includes a ball joint 33, a first connecting shaft 31 and a second connecting shaft 32. The first connecting shaft 31 has a first end provided with a first ball groove 312a, and the second connecting shaft 32 has a first end provided with a second ball groove 322a. The first ball groove 312a and the second ball groove 322a each accommodate a partial structure of the ball joint 33, such that the first connecting shaft 31 and the second connecting shaft 32 are rotatably coupled by the ball joint 33. A second end of the first connecting shaft 31 away from the first ball groove 312a is coupled to the steering shaft 10, and a second end of the second connecting shaft 32 away from the second ball groove 322a is coupled to the power steering system 20.

Figure 2:
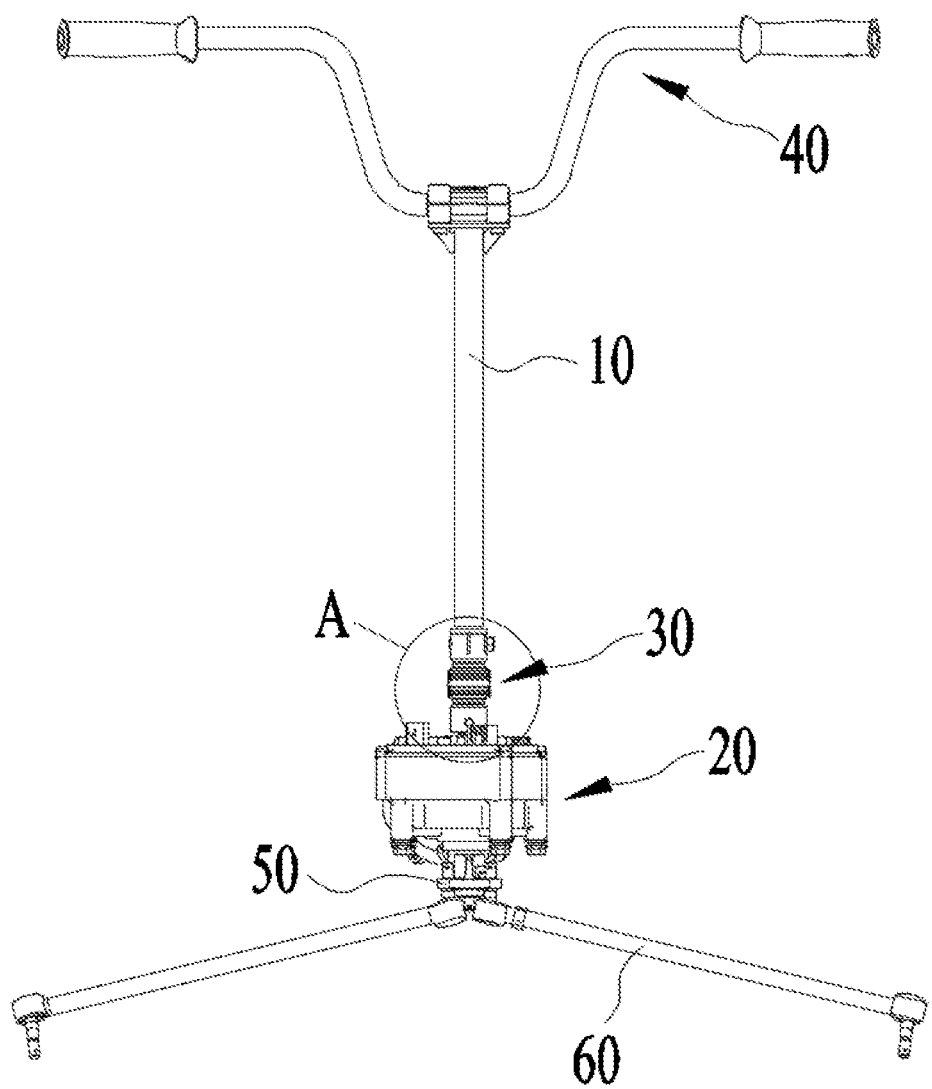
FIG. 2 is a schematic structural diagram of the steering mechanism shown in FIG. 1, from another angle of view.

Specifically, referring to FIGS. 1 and 2, the steering mechanism according to the present embodiment further includes a steering handle assembly 40, a steering rocker arm 50, and two steering links 60. The steering handle assembly 40 is coupled to the steering shaft 10. The steering rocker arm 50 has a first end rotatably coupled to the power steering system 20 and a second end rotatably coupled to the two steering links 60. The steering links 60 are coupled to wheels of the all-terrain vehicle to steer the wheels during driving.

The power steering system 20 according to the present embodiment is an electric power steering (EPS) system. The EPS system is a power steering system that relies directly on an electric motor to provide auxiliary torque directly. Compared with a hydraulic power steering (HPS) system, the EPS system can eliminate the need for power steering oil pumps, hoses, hydraulic oil, conveyor belts and engine-mounted pulleys that are necessary for the HPS system, thereby saving energy and protecting the environment. In addition, the EPS system also has the advantages of simple adjustment, flexible assembly and capability of providing steering power under various conditions. It can be understood that the power steering system 20 may also be an HPS system in other embodiments.

In the adjusting mechanism 30 of the present embodiment, the first connecting shaft 31 and the second connecting shaft 32 are rotatably coupled by the ball joint 33. When an operator turns the steering handle assembly 40 in a process of driving the all-terrain vehicle, power transmission with a variable angle can be performed between the first connecting shaft 31 and the second connecting shaft 32. Thus, it is possible to avoid a situation where a steering wheel of the all-terrain vehicle becomes heavy or difficult to turn in a long-term frequent steering process, prevent abrasion of parts for fixing the steering shaft 10, greatly improve controllability of an operator during driving, and guarantee driving safety.

Figure 4:
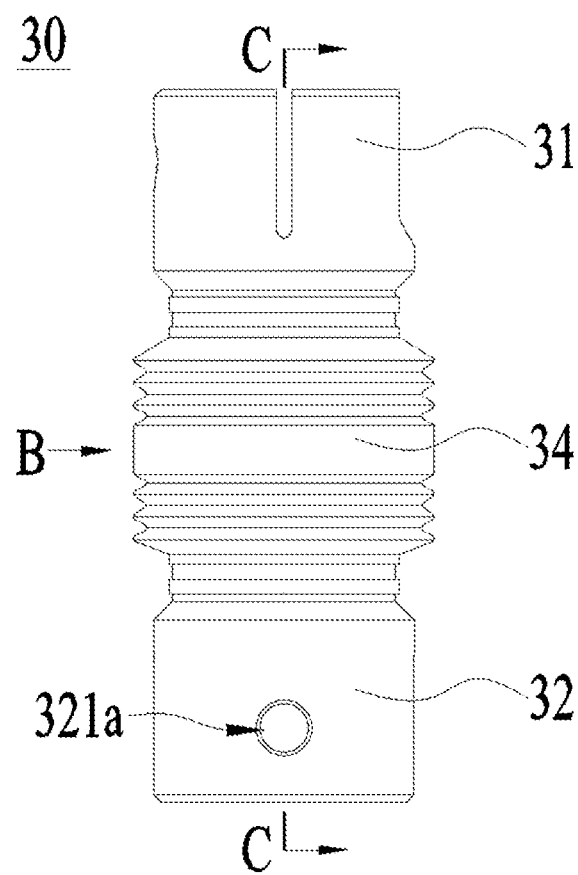
FIG. 4 is a schematic structural diagram of an adjusting mechanism shown in FIG. 1.
Figure 5:
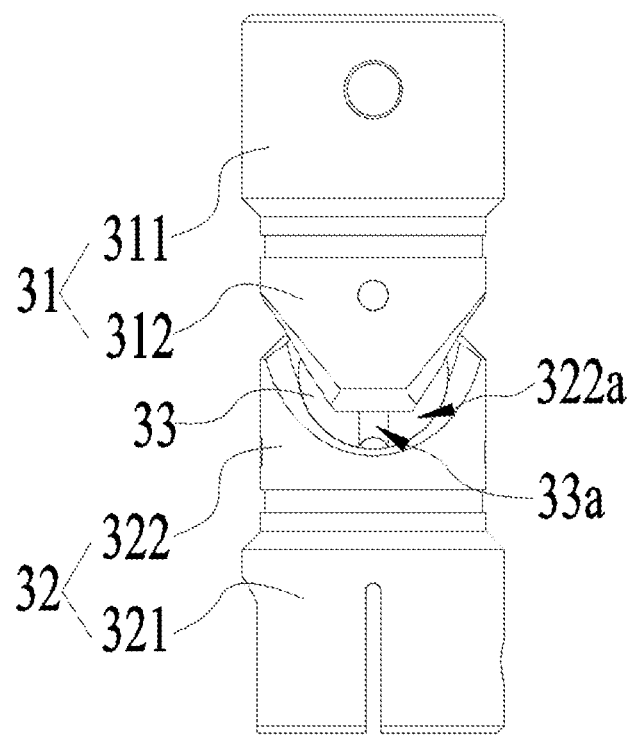
FIG. 5 is a view of the adjusting mechanism shown in FIG. 4 in direction B, with a dust cover omitted.
Figure 6:
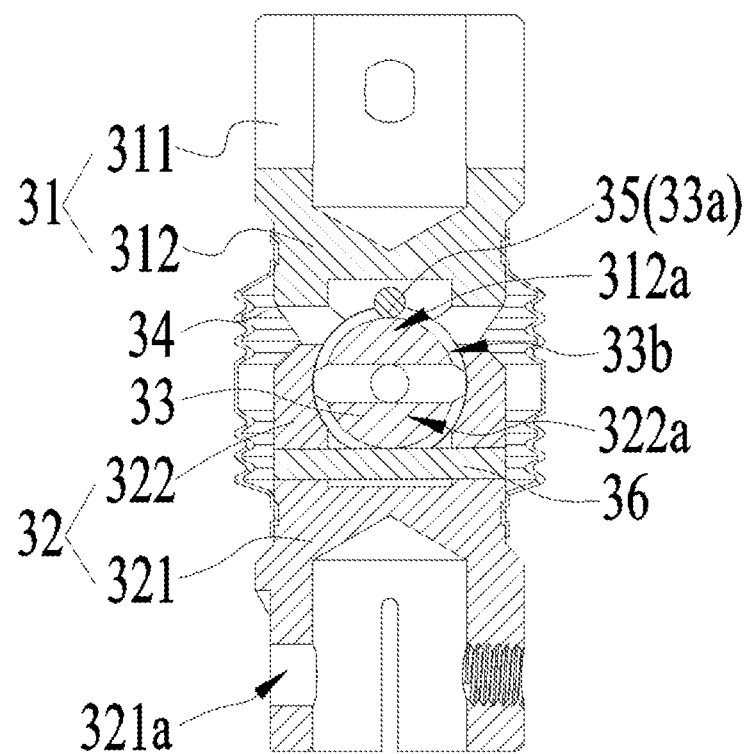
FIG. 6 is a sectional view of the adjusting mechanism shown in FIG. 4 along a C-C line.

Referring to FIGS. 4 to 6, the first connecting shaft 31 in the present embodiment includes a first body 311 and a first ball yoke 312 arranged at an end of the first body 311, and the first ball yoke 312 is has the first ball groove 312a. The second connecting shaft 32 includes a second body 321 and a second ball yoke 322 arranged at an end of the second body 321, and the second ball yoke 322 has the second ball groove 322a. The first ball yoke 312 and the second ball yoke 322 are staggered, such that a partial area of the first ball groove 312a overlaps with a partial area of the second ball groove 322a, and a partial structure of the ball joint 33 is located in an overlap area. The first connecting shaft 31 can drive the second connecting shaft 32 to twist in a twisting process, thus realizing the variable-angle power transmission.

Figure 7:
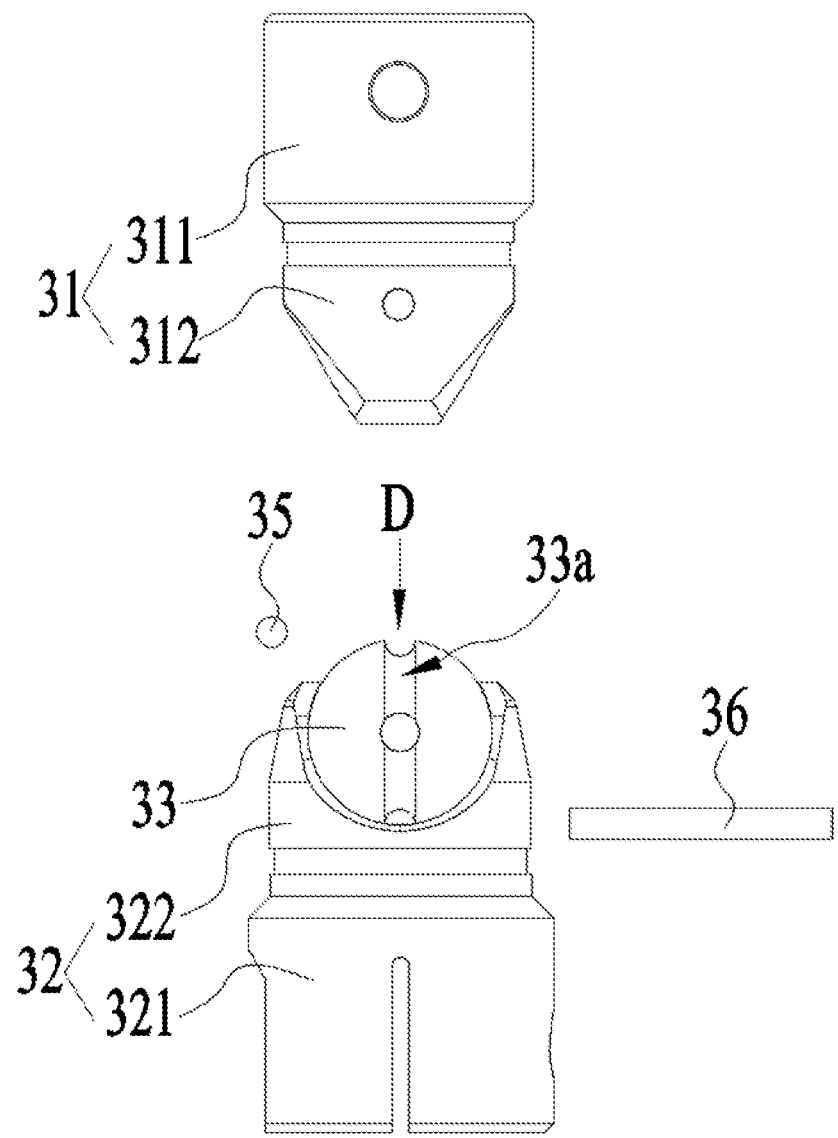
FIG. 7 is an exploded view of FIG. 5.
Figure 8:
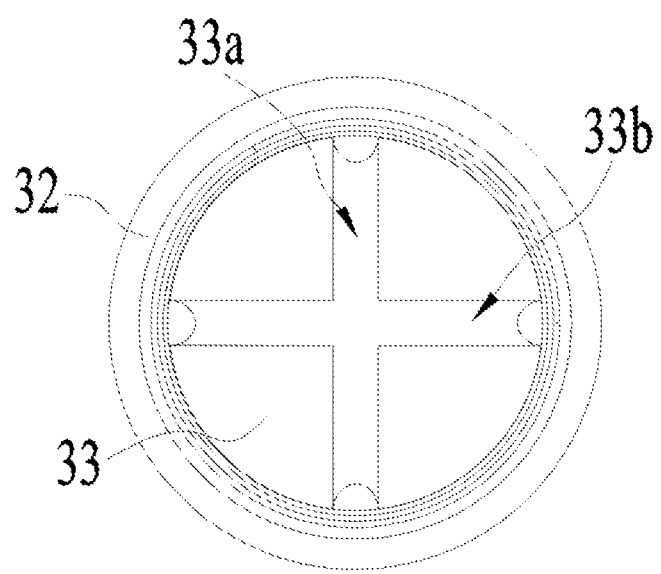
FIG. 8 is a view in direction D of FIG. 7.

Further, referring to FIGS. 7 and 8, along a great circle of the ball joint 33, the ball joint 33 in the present embodiment is provided with a first groove 33a cooperating with the first ball yoke 312 and a second groove 33b cooperating with the second ball yoke 322, and the first groove 33a and the second groove 33b are arranged in a crisscross pattern. For example, when a steering force is applied, two end portions of the first ball yoke 312 slide in the first groove 33a, and correspondingly, two end portions of the second ball yoke 322 slide in the second groove 33b, such that directional adjustment can be realized, and the variable-angle power transmission can be achieved. Referring to FIGS. 6 and 7, the adjusting mechanism 30 further includes a first pin 35 and a second pin 36. The first pin 35 passes through the first ball groove 312a, a partial structure of the first pin 35 is located in the first groove 33a, and both ends of the first pin 35 are fixedly coupled to the first ball yoke 312. The second pin 36 passes through the second ball groove 322a, and a partial structure of the second pin 36 is located in the second groove 33b. That is, the first pin 35 and the second pin 36 limit the ball joint 33, thus preventing the ball joint 33 from moving, and also provide a bearing effect during rotation of the first connecting shaft 31 and the second connecting shaft 32. In other embodiments, the first pin 35 and the second pin 36 may be omitted.

In addition, referring to FIGS. 4 and 6, the adjusting mechanism 30 in the present embodiment further includes a dust cover 34, and the dust cover 34 covers the ball joint 33, the first ball groove 312a and the second ball groove 322a, to block dust for the ball joint 33 and protect the ball joint 33.

Further, the power steering system 20 according to the present embodiment is splined to the second connecting shaft 32.

Figure 3:
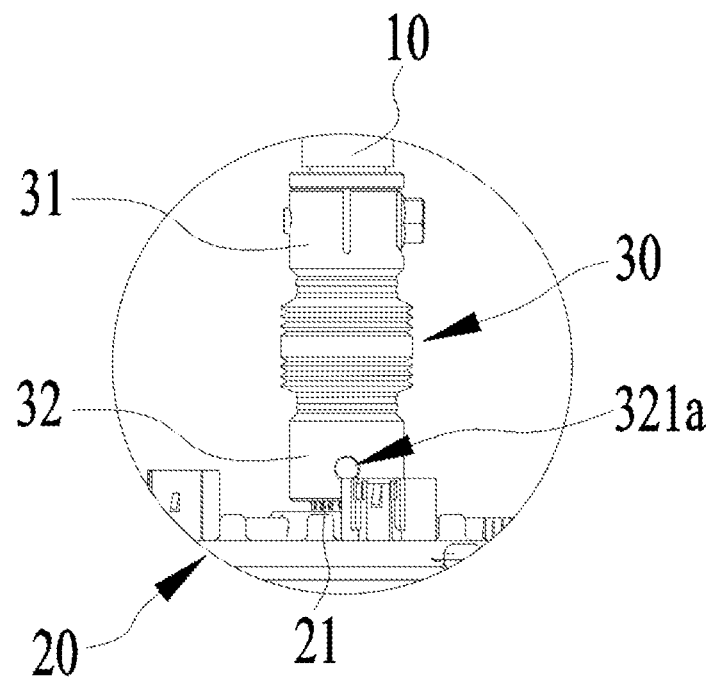
FIG. 3 is a partial enlarged view at A in FIG. 2.

Specifically, referring to FIG. 3, the power steering system 20 according to the present embodiment includes a connecting rod 21 having an external spline (not shown), and the second connecting shaft 32 is provided with a shaft hole (not shown) having an internal spline. The second connecting shaft 32 is fitted over the connecting rod 21, and the external spline is fitted with the internal spline. The splines have a high load-bearing capacity and good centering property, thus improving the reliability of connection between the power steering system 20 and the second connecting shaft 32. In other embodiments, the connecting rod 21 may be provided with an internal spline, the second connecting shaft 32 may be provided with an external spline, and the connecting rod 21 may be fitted over the second connecting shaft 32.

With continued reference to FIGS. 3, 4 and 6, in the present embodiment, the connecting rod 21 has a side wall provided with a first through hole (not shown), and the second connecting shaft 32 has a side wall provided with a second through hole 321a. In a fitted-over state, the first through hole is in communication with the second through hole 321a, and a fastener passes through the first through hole and the second through hole 321a to fasten the second connecting shaft 32 to the connecting rod 21. That is, the connecting rod 21 and the second connecting shaft 32 in the present embodiment are fixed by using a spline connection in conjunction with a fastening connection, thus improving the reliability of the connection between the power steering system 20 and the second connecting shaft 32. In other embodiments, the power steering system 20 and the second connecting shaft 32 may be coupled by the fastening connection alone, without the spline connection.

Similarly, the first connecting shaft 31 and the steering shaft 10 may be fixed by using one of the spline connection and the fastening connection, or by using the spline connection in conjunction with the fastening connection.

Another embodiment of the present disclosure further provides an all-terrain vehicle of a straddle type. The all-terrain vehicle includes a frame and the steering mechanism according to the above embodiment, and the power steering system 20 is fixed to the frame.

The above description only involves some embodiments of the present disclosure and is not intended to limit the present disclosure, and various modifications and changes may be made to the present disclosure by those skilled in the art. Any modification, equivalent replacement, or improvement made within the principle of the present disclosure shall be included in the protection scope of the present disclosure.

What is claimed is:

1. A steering mechanism of an all-terrain vehicle, comprising:
    a steering shaft;
    a power steering system; and
    an adjusting mechanism comprising a ball joint, a first connecting shaft and a second connecting shaft,
    wherein the first connecting shaft has a first end provided with a first ball groove, the second connecting shaft has a first end provided with a second ball groove, and each of the first ball groove and the second ball groove is configured to accommodate a partial structure of the ball joint, to allow the first connecting shaft and the second connecting shaft to be rotatably coupled by the ball joint;
    a second end of the first connecting shaft away from the first ball groove is coupled to the steering shaft, and a second end of the second connecting shaft away from the second ball groove is coupled to the power steering system,
    wherein the first connecting shaft comprises a first body and a first ball yoke arranged at an end of the first body, and the first ball yoke has the first ball groove; and the second connecting shaft comprises a second body and a second ball yoke arranged at an end of the second body, and the second ball yoke has the second ball groove; and
    the first ball yoke and the second ball yoke are staggered to enable a partial area of the first ball groove to overlap with a partial area of the second ball groove, and the partial structure of the ball joint is located in an overlap area, wherein the ball joint is provided with a first groove cooperating with the first ball yoke and a second groove cooperating with the second ball yoke, along a great circle of the ball joint, and the first groove and the second groove are arranged in a crisscross pattern; and the adjusting mechanism further comprises:

a first pin passing through the first ball groove, a partial structure of the first pin being located in the first groove, and both ends of the first pin being fixedly coupled to the first ball yoke; and a second pin passing through the second ball groove, a partial structure of the second pin being located in the second groove, and both ends of the second pin being fixedly coupled to the second ball yoke.

2. The steering mechanism according to claim 1, wherein two end portions of the first ball yoke are configured to slide in the first groove, and two end portions of the second ball yoke are configured to slide in the second groove.

3. The steering mechanism according to claim 1, wherein the adjusting mechanism further comprises a dust cover covering the ball joint, the first ball groove and the second ball groove.

4. The steering mechanism according to claim 1, wherein the power steering system is splined to the second connecting shaft.

5. The steering mechanism according to claim 4, wherein the power steering system comprises a connecting rod having an external spline, the second connecting shaft is provided with a shaft hole having an internal spline, and the internal spline is arranged on an inner wall of the shaft hole; and the second connecting shaft is fitted over the connecting rod, and the external spline is fitted with the internal spline.

6. The steering mechanism according to claim 5, wherein the second connecting shaft has a side wall provided with a second through hole; in a fitted-over state, the second connecting shaft is fastened to the connecting rod by the second through hole.

7. The steering mechanism according to claim 4, wherein the power steering system comprises a connecting rod having an internal spline, the second connecting shaft is provided with an external spline, and the connecting rod is fitted over the second connecting shaft.

8. The steering mechanism according to claim 1, wherein the power steering system is fastened to the second connecting shaft.

9. The steering mechanism according to claim 1, comprising at least one of the first connecting shaft being splined to the steering shaft, and the first connecting shaft being fastened to the steering shaft.

10. The steering mechanism according to claim 1, wherein the steering mechanism further comprises a steering rocker arm and two steering links; and the steering rocker arm has a first end rotatably coupled to the power steering system and a second end rotatably coupled to the two steering links.

11. The steering mechanism according to claim 1, further comprising a steering handle assembly coupled to the steering shaft.

12. The steering mechanism according to claim 1, wherein the power steering system is an electric power steering system.

13. An all-terrain vehicle with a straddle, comprising:

a frame; and a steering mechanism, comprising:

a steering shaft;

a power steering system fixed to the frame; and an adjusting mechanism comprising a ball joint, a first connecting shaft and a second connecting shaft, wherein the first connecting shaft has a first end provided with a first ball groove, the second connecting shaft has a first end provided with a second ball groove, and each of the first ball groove and the second ball groove is configured to accommodate a partial structure of the ball joint, to allow the first connecting shaft and the second connecting shaft to be rotatably coupled by the ball joint;

a second end of the first connecting shaft away from the first ball groove is coupled to the steering shaft, and a second end of the second connecting shaft away from the second ball groove is coupled to the power steering system, wherein the first connecting shaft comprises a first body and a first ball yoke arranged at an end of the first body, and the first ball yoke has the first ball groove; and the second connecting shaft comprises a second body and a second ball yoke arranged at an end of the second body, and the second ball yoke has the second ball groove; and the first ball yoke and the second ball yoke are staggered to enable a partial area of the first ball groove to overlap with a partial area of the second ball groove, and the partial structure of the ball joint is located in an overlap area, wherein the ball joint is provided with a first groove cooperating with the first ball yoke and a second groove cooperating with the second ball yoke, along a great circle of the ball joint, and the first groove and the second groove are arranged in a crisscross pattern; and the adjusting mechanism further comprises:

a first pin passing through the first ball groove, a partial structure of the first pin being located in the first groove, and both ends of the first pin being fixedly coupled to the first ball yoke; and a second pin passing through the second ball groove, a partial structure of the second pin being located in the second groove, and both ends of the second pin being fixedly coupled to the second ball yoke.

14. The all-terrain vehicle according to claim 13, wherein the power steering system is splined to the second connecting shaft.

15. The all-terrain vehicle according to claim 14, wherein the power steering system comprises a connecting rod having an external spline, the second connecting shaft is provided with a shaft hole having an internal spline, and the internal spline is arranged on an inner wall of the shaft hole; and the second connecting shaft is fitted over the connecting rod, and the external spline is fitted with the internal spline.

16. The all-terrain vehicle according to claim 15, wherein the second connecting shaft has a side wall provided with a second through hole; in a fitted-over state, the second connecting shaft is fastened to the connecting rod by the second through hole.

* * * * *